United States Patent [19]

Martinetz et al.

[11] Patent Number: 5,740,686
[45] Date of Patent: Apr. 21, 1998

[54] METHOD AND APPARATUS FOR ROLLING A METAL STRIP

[75] Inventors: Thomas Martinetz, München; Thomas Poppe, Munich; Guenter Soergel, Nuremberg; Otto Gramckow, Erlangen, all of Germany

[73] Assignee: Siemens Aktiengesellschaft, Munich, Germany

[21] Appl. No.: 496,271

[22] Filed: Jun. 28, 1995

[30] Foreign Application Priority Data

Jul. 7, 1994 [EP] European Pat. Off. ............ 94110599

[51] Int. Cl.⁶ .................................................. B21B 37/00
[52] U.S. Cl. ........................ 72/8.4; 72/11.2; 72/11.6; 72/12.2
[58] Field of Search ...................... 72/8.3, 8.5, 8.9, 72/11.3, 12.2, 12.7, 234, 235, 365.2, 11.2, 11.6, 8.4, 11.1; 395/21, 23

[56] References Cited

U.S. PATENT DOCUMENTS

| | | | |
|---|---|---|---|
| 4,294,094 | 10/1981 | Okado et al. | 72/12.7 |
| 5,193,066 | 3/1993 | Konishi et al. | 364/472.1 |
| 5,414,619 | 5/1995 | Katayama et al. | 364/151 |

FOREIGN PATENT DOCUMENTS

| | | |
|---|---|---|
| 0 460 892 | 11/1991 | European Pat. Off. . |
| 0 534 221 | 3/1993 | European Pat. Off. . |
| 43 01 130 | 7/1993 | Germany . |
| 3-071909 | 3/1991 | Japan . |
| 2 042 389 | 9/1980 | United Kingdom . |

OTHER PUBLICATIONS

Patent Abstracts of Japan, vol. 16, No. 515 (M-1329), Oct. 23, 1992 (Toshiba Corp.), JP 4-190910, Jul. 9, 1992.
Patent Abstracts of Japan, vol. 16, No. 467 (M-1317), Sep. 29, 1992 (Toshiba Corp.), JP 4-167908, Jun. 16, 1992.
Patent Abstracts of Japan, vol. 13, No. 28 (M-788), Jan. 23, 1989 (Kobe Steel Ltd.), JP-63-238912, Oct. 5, 1988.

Primary Examiner—Lowell A. Larson
Assistant Examiner—Ed Tolan
Attorney, Agent, or Firm—Kenyon & Kenyon

[57] ABSTRACT

In rolling a metal strip in a roughing line and a finishing line, the rolling process in the roughing line is adjusted as a function of a predicted value for the change in width of the metal strip in the finishing line such that the metal strip has a given specified finished strip width on leaving the finishing line. In order to permit a reliable prediction of the change in width despite the lack of accurate information regarding the dependence of the change in width on influencing parameters that affect the process, this dependence is simulated in a neural network whose network parameters are adapted after each passage of a metal strip through the finishing line as a function of the influencing parameters measured or calculated during the passage and the measured actual change in width.

18 Claims, 2 Drawing Sheets

METHOD AND APPARATUS FOR ROLLING A METAL STRIP

FIELD OF THE INVENTION

The present invention pertains to a process for rolling a metal strip in a roughing line and a finishing line, where the rolling process in the roughing line is adjusted as a function of a predicted value for the change in width of the metal strip in the finishing line such that the metal strip has a specified predetermined finished strip width on leaving the finishing line.

BACKGROUND INFORMATION

The change in width of a metal strip that is associated with the rolling process is also known as flattening. The flattening that occurs in a finishing line is thus equal to the difference between the finished strip width (i.e., the width of the strip coming out of the finishing line) and the incoming strip width (i.e., the width of the strip entering the finishing line) and this is always based on flattening the metal strips at the same temperature. An accurate prediction of the flattening effect or the change in width is needed in order to be able to roll a metal strip in edging passes in a roughing line to a preliminary strip width such that the subsequent flattening in the finishing line leads to the desired specified finished strip width. In doing so, the rolling process in the roughing line is adjusted as a function of the predicted flattening such that the metal strip is rolled in the roughing line to a preliminary strip width that corresponds to the specified finished strip width minus the predicted flattening in the finishing line.

The change in width of the metal strip in the finishing line depends on several influencing factors that originate in the metal strip itself, such as its width, thickness and temperature, as well as factors that act on the metal strip during the rolling operation in the finishing line, such as the rolling forces in the individual roll stands in the rolling line. Otherwise, however, it is not known in detail which influencing factors ultimately determine the change in width or to what extent each factor is operative.

An object of this invention is based on solving the problem of permitting a reliable prediction of the flattening effect despite the lack of knowledge of the precise relationships between the flattening effect and the parameters that influence it.

SUMMARY OF THE INVENTION

This and other objects are achieved by the method of the present invention. The aforementioned problem is solved in that as part of an advance calculation performed at least before the last edging pass in the roughing line for preliminary adjustment of the finishing line, various influencing parameters on which the change in width depends are determined and sent as input parameters to a neural network with variable network parameters. The neural network generates as a network response a calculated value for the change in width on the basis of which the predicted value is determined. During the passage of the metal strip through the finishing line, the influencing parameters are measured or calculated from other measured process parameters. After the passage of the metal strip through the finishing line, the measured or calculated influencing parameters are sent to the neural network. The deviation between the resulting network response and the measured actual change in width of the metal strip is used to adapt the network parameters in order to reduce this deviation.

The prediction of the change in width of the metal strip in the finishing line is made with the help of a self-learning neural network that learns on the basis of the adaptive changes in the network parameters without having to make any model assumptions for the relationship between the influencing parameters and the change in width. Using the neural network makes it possible to include in the prediction of the change in width all the influencing parameters that can have an effect on the change in width in any way. At least some of the following parameters are used as influencing parameters: the temperature and thickness of the metal strip prior to entering the finishing line, the temperature, thickness, specified width and the exit speed of the metal strip in emerging from the finishing line, the strength of the material and the profile of the metal strip, the relative reduction in thickness of the metal strip in the individual roll stands of the finishing line, the sliding positions of the sliding rolls and the tension in the metal strip between the individual roll stands of the finishing line.

In comparison with previous methods of predicting the change in width on the basis of model assumptions, a significant improvement in the quality of predictions has been achieved with the help of this neural network. In the simplest case, the neural network includes an adaptive linear neuron (Adaline). As an alternative, a feed-forward network with a concealed layer including elements with sigmoidal response properties could also be used.

Since the influencing parameters remain essentially the same for successive strips (i.e., subsequent metal strips of the same type), the measured actual changes in width of the first metal strips can be used here as the predicted value for the change in width or the flattening effect, whereas with change-over strips (i.e., when the type of strip being processed is changed to a new type) the network response of the neural network serves as the predicted value.

Taking into account the fact that there may be one or more metal strips between the metal strip n+i ($i \geq 1$) in the roughing line upstream from at least the last edging pass and the metal strip n coming out of the finishing line, and thus the measurements of the influencing parameters and adaptation of the neural network cannot take effect until the second, third or other successive strips, the predicted value $y_{pre}(n+i)$ for the change in width of the metal strip n+i in the finishing line is calculated from the calculated value $y_{NN}(x_{prev}(n+i))$ generated by the neural network for the change in width, the network response $y_{NN}(x_{after}(n))$ generated for the metal strip n leaving the finishing line on the basis of the measured or calculated influencing parameters $x_{after}$ and the actual change in width $y_{actual}(n)$ as follows:

$$y_{pre}(n+i) = k_1 \cdot y_{actual}(n) + k_2 \cdot y_{NN}(x_{prev}(n+i)) + (1-k_1-k_2) \cdot y_{NN}(x_{after}(n))$$

where $0 \leq k_1, k_2 \leq 1$.

The values $k_1=1$ and $k_2=0$ are used for an ideal successive strip (so-called short-term heredity) and the values $k_1=0$ and $k_2=1$ are used for an ideal change-over strip (so-called long-term heredity), where the value $k_1$ is a monotonically increasing function of the absolute difference $y_{actual}(n)-y_{NN}(n)$ and the value $k_2$ is a monotonically increasing function of the absolute difference $y_{actual}(n+i)-y_{NN}(n)$.

DETAILED DESCRIPTION

Figure 1:
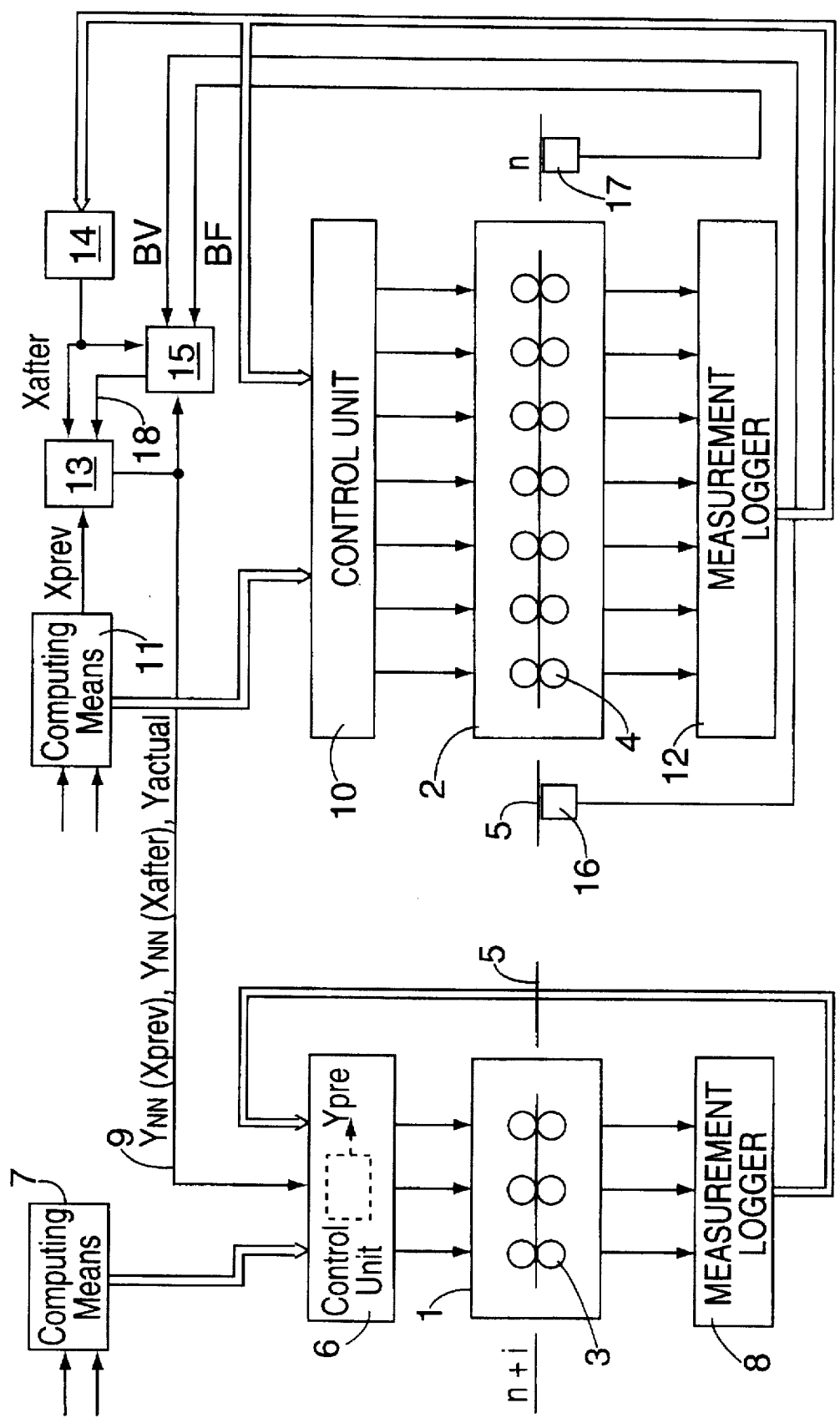
FIG. 1 shows a block diagram of a process control in a roughing line and a finishing line in the method and apparatus according to the present invention.

FIG. 1 shows a roughing line 1 and a finishing line 2 with roll stands 3 and 4 for rolling metal strips 5. The roughing line 1 is controlled by a control unit 6 that acts on the individual roll stands 3, where it activates different control elements. The control unit 6 receives the information needed to control the roll stands 3 from a computing means 7 and from a measurement logger 8. At the start of the rolling operation, no measured values for the parameters needed to control the process are yet available, so predicted values for the parameters are calculated in computing means 7 on the basis of model assumptions, and then these predicted values are sent to the control unit 6 for presetting the roughing line 1. During the process, the measured values of the parameters that are used to control the process are acquired by the measurement logger 8 and sent to the control unit 6.

Control unit 6 also receives via line 9 information for determining the predicted value $y_{pre}$ for the change in width of metal strip 5 to be expected in finishing line 2. The rolling operation (i.e., the upsetting of metal strip 5 in roughing line 1) is controlled as a function of this predicted value $y_{pre}$ such that the width of the preliminary strip (i.e., the width of metal strip 5 on leaving roughing line 1) is equal to the desired specified finished strip width of metal strip 5 on leaving finishing line 2 minus the predicted change in width $y_{pre}$ of metal strip 5 in finishing line 2. Thus, with an accurate prediction of the change in width of metal strip 5 in finishing line 2, metal strip 5 has the desired specified finished strip width on its departure from finishing line 2.

As is the case with roughing line 1, individual roll stands 4 in finishing line 2 are controlled by a control unit 10 which obtains the information required for this purpose from a computing means 11 and a measurement logger 12. Before a metal strip 5 that passes through roughing line 1 enters finishing line 2, predicted values for the parameters needed to regulate the rolling operation in finishing line 2 are calculated in computing means 11 and sent to control unit 10 for presetting finishing line 2. Of these values that are determined in advance, those that can have an influence on the change in width of metal strip 5 in finishing line 2 are sent as influencing parameters $y_{prev}$ to a neural network 13 that generates a calculated value $y_{NN}(x_{prev})$ for the change in width as the network response, which is then made available on line 9 for calculating the predicted value $y_{pre}$ in control unit 6. The following values which form the input vector $x_{prev}$ are especially suitable for use as the influencing parameters or input parameters for neural network 13: the temperature of the preliminary strip TV, the thickness of the preliminary strip DV, the temperature of finished strip TF, the thickness of finished strip DF, the specified finished strip width BF, exit velocity VF of the finished strip from finishing line 2, strength of the material AL, profile PR, relative reduction in thickness EPS 1 through EPS 7 in individual roll stands 4, the sliding positions SCH 3 through SCH 5 of the sliding rolls and tension ZUG 1 through ZUG 6 in metal strip 5 between individual roll stands 4.

In the passage of metal strip 5 through finishing line 2, the process-relevant parameters, including the parameters TV, DV, . . . , ZUG 6 are measured by measurement logger 12 and sent to control unit 10 and a unit 14 for subsequent calculation. The subsequent calculation includes, for example, statistical processing of the measured influencing parameters and a calculation of parameters that cannot be measured directly as a function of other measured values. With the help of these subsequently calculated influencing parameters (i.e., parameters that are much more accurate in comparison with the advance calculation in computing means 11), the network parameters of neural network 13 are adapted after the passage of metal strip 5 through finishing line 2. To do so, the subsequently calculated influencing parameters are combined in an input vector $X_{after}$ and sent to neural network 13. The network response $y_{NN}(x_{after})$ then received from the neural network 13 is sent to an adaptive algorithm 15 that also receives the actual preliminary strip width BV measured at point 16 upstream from finishing line 2 and the actual finished strip width BF measured at point 17 downstream from finishing line 2. The resulting actual change in width $y_{actual}$=BF–BV is compared with the network response $y_{NN}(x_{after})$ and the actual change in width $y_{actual}$ is used for adaptive adjustment of the network parameters via connection 18 in order to reduce this deviation. In addition to the calculated value $y_{NN}(x_{prev})$, the values $y_{NN}(x_{after})$ and $y_{actual}$ are also made available on line 9 and are sent to control unit 6 for calculating the predicted value $y_{pre}$ for the change in width.

In the example illustrated in FIG. 1, the last subsequent calculation of the influencing parameters $x_{after}$ and adaptation of neural network 13 for strip n at the end of finishing line 2 are performed, while the next prediction is requested for the change in width of metal strip 5 in finishing line 2 for the strip n+1 that is at the beginning of roughing line 1, but at least before the last upsetting pass in roughing line 1. Between these two strips n and n+1 there are thus i–1 metal strips 5 in roughing line 1 and finishing line 2, where i≧1. The predicted value $y_{pre}$(n+1) for the change in width of the metal strip n+1 in finishing line 2 is calculated in control unit 6 from the calculated value $y_{NN}(x_{prev}(n+1))$ generated for neural network 13 for the change in width of metal strip n+1, the network response $y_{NN}(x_{after}(n))$ generated on the basis of the influencing parameters $x_{after}(n)$ calculated subsequently for the metal strip n and the actual change in width $y_{actual}(n)$ of the metal strip n as follows:

$$y_{pre}(n+i)=k_1 \cdot y_{actual}(n)+k_2 \cdot y_{NN}(x_{prev}(n+i))+(1-k_1-k_2) \cdot y_{NN}(x_{after}(n))$$

where $0 \leq k_1, k_2 \leq 1$.

The values $k_1=1$ and $k_2=0$ are valid for an ideal successive strip (i.e., when there are successive strips of the same type), while the values $k_1=0$ and $k_2=1$ are used for an ideal change-over strip (i.e., when the type of strip is changed from one type to another). For strips in between, the value $k_1$ is preferably a function of the difference $y_{actual}(n)-y_{NN}(n)$, for example, $k_1=p_1 \cdot |y_{actual}(n)-y_{NN}(n)|$ and the value $k_2$ is preferably a function of the difference $y_{NN}(n+i)-y_{NN}(n)$, for example, $k_2=p_2 \cdot |y_{NN}(n+i)-y_{NN}(n)|$.

Figure 2:
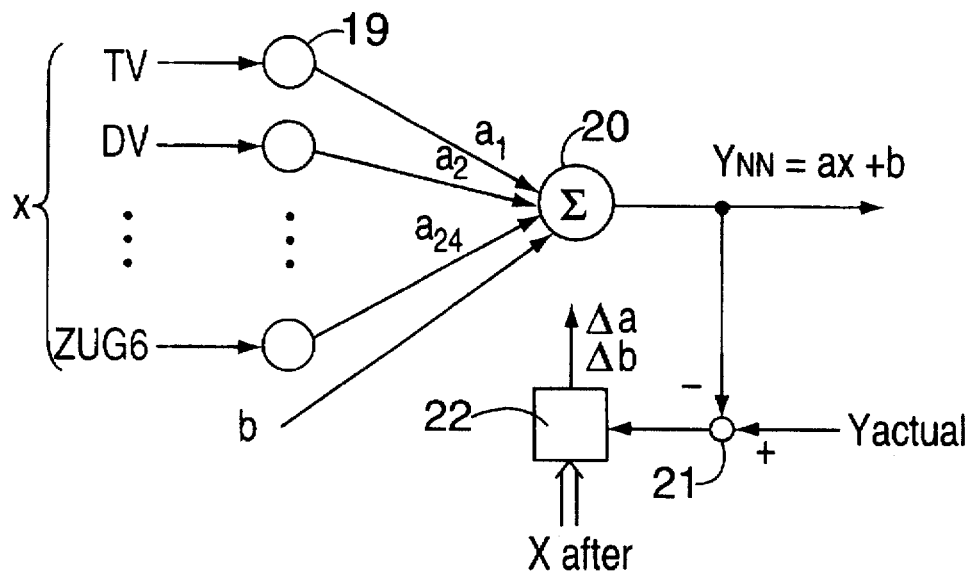
FIG. 2 shows an adaptive linear neuron.

FIG. 2 shows an adaptive linear neuron (Adaline) as an example of the neural network 13. The 24 influencing parameters TV, DV, . . . , ZUG 6 that are combined in the input vector x are sent via an appropriate number of input elements 19 to a summation point 20 where they are added up with individual weighting factors $a_1, a_2, \ldots, a_{24}$ and a constant value b to yield the network response $$y_{NN}=ax+b, \text{ where } a=(a_1, a_2, \ldots, a_{24})$$

The network response $y_{NN}$ is compared with the measured actual change in width $y_{actual}$ in a comparison point 21, where the network parameters $a_1, a_2, \ldots, a_{24}, b$ are adapted in the downstream adaptation algorithm 22 according to the equations $$\Delta a = \mu(y_{actual}-y_{NN}) \cdot x_{after} \text{ and } \Delta b = \mu(y_{actual}-y_{NN})$$

where µ is the increment of adaptation.

Figure 3:
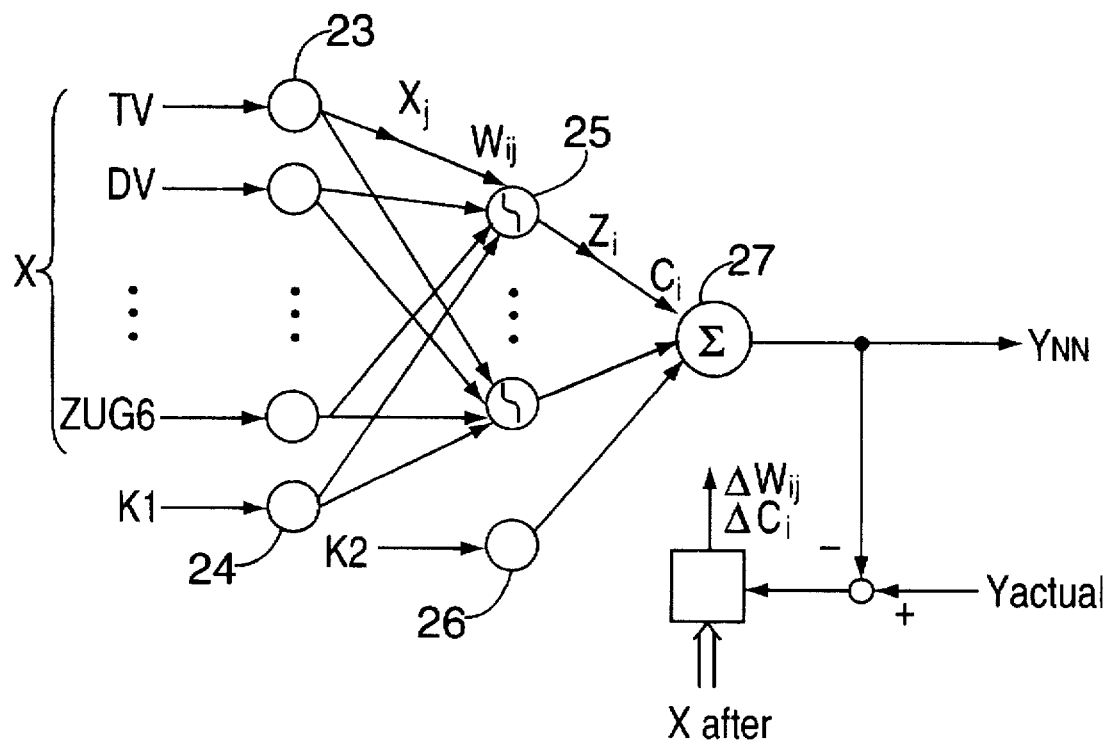
FIG. 3 shows a feed-forward network as an example of the neural network used in the present invention.

FIG. 3 shows a feed-forward network as an example of the neural network 13, having an input layer with an input element 23 for each of the influencing parameters TV, DV, ...., ZUG 6. An offset value K1 is sent to the neural network via an additional input element 24. Downstream from the input layer is a concealed layer comprising several elements 25, namely in this case 10 such elements, each of which has a response with a sigmoid curve between −1 and +1. The influencing parameters $x_j$,=1, ...., 24 and $x_{25}$=K1 sent to the elements 25 at the input end are added up in each element 25 of the concealed layer after being weighted with individual weighting factors $w_{ij}$,i=1, ...., 10, j=1, ...., 25 and the response $$z_i = \tanh \sum_{j=1}^{25} w_{ij} x_j$$

is generated at the output end from the sum thus obtained. The concealed layer has an additional element 26 that serves as the input element for another offset value K2 and generates a corresponding output signal $z_{11}$. Downstream from the concealed layer is an output element 27 that adds up the responses $z_i$ of the elements 25 of the concealed layer after weighting them with an individual weighting factor $c_i$ to yield the network response $$y_{NN} = \sum_{i=1}^{11} c_i z_i$$

The on-line adaptation of the network parameters $w_{ij}$ and $c_i$ is accomplished on the basis of the back-propagation algorithm after the passage of a metal strip 5 through the finishing line 2.

What is claimed is:

1. A method for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the method comprising:

calculating first influencing parameters before a last edging pass in the roughing line to preset the finishing line, the change in width being dependent on the first influencing parameters;

sending the first influencing parameters and variable network parameters to a neural network;

generating, using the neural network, a calculated value for the change in width as a function of the predicted value;

measuring and calculating second influencing parameters after the metal strip passes through the finishing line as a function of other measured process parameters;

providing the second influencing parameters to the neural network after the metal strip passes through the finishing line; and reducing a deviation between a resulting network response and a measured change in width of the metal strip by adapting the variable network parameters of the neural network.

2. The method of claim 1, wherein the first influencing parameters include at least one of a temperature and thickness of the metal strip before entering the finishing line, a temperature, thickness, specified width and exit velocity of the metal strip after leaving the finishing line, a strength of a material of the metal strip, a profile of the metal strip, a relative reduction in a thickness of the metal strip in individual roll stands of the finishing line, sliding positions of sliding rolls and tension in the metal strip between the individual roll stands of the finishing line.

3. The method of claim 1, wherein the neural network includes an adaptive linear neuron.

4. The method of claim 1, wherein the neural network includes a feed-forward network with a concealed layer including elements with a sigmoid response.

5. A method for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the method comprising:

calculating first influencing parameters before a last edging pass in the roughing line to preset the finishing line, the change in width being dependent on the first influencing parameters;

sending the first influencing parameters and variable network parameters to a neural network;

generating, using the neural network, a calculated value for the change in width as a function of the predicted value;

measuring and calculating second influencing parameters after the metal strip passes through the finishing line as a function of other measured process parameters;

providing the second influencing parameters to the neural network after the strip metal passes through the finishing line; and reducing a deviation between a resulting network response and a measured change in width of the metal strip by adapting the variable network parameters of the neural network, wherein, when a type of metal strip is changed, the resulting network response is used as the predicted value for the change in width and to adjust the roughing line, and wherein, when processing successive metal strips of a same type, the measured change in width of the preceding successive metal strips is used as the predicted value for the change in width and for adjusting the roughing line.

6. A method for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the method comprising:

calculating first influencing parameters before a last edging pass in the roughing line to preset the finishing line, the change in width being dependent on the first influencing parameters;

sending the first influencing parameters and variable network parameters to a neural network;

generating, using the neural network, a calculated value for the change in width as a function of the predicted value;

measuring and calculating second influencing parameters after the metal strip passes through the finishing line as a function of other measured process parameters;

providing the second influencing parameters to the neural network after the strip metal passes through the finishing line; and reducing a deviation between a resulting network response and a measured change in width of the metal strip by adapting the variable network parameters of the neural network, wherein, when at least one strip is positioned between a first metal strip (n+i, where i≧1) upstream from at least the last edging pass in the roughing line and a second metal strip (n) leaving the finishing line, the predicted value for the change in width of the first metal strip in the finishing line is calculated from a calculated value ($y_{NN}(x_{prev}(n+i))$) generated by the neural network, the resulting network response ($y_{NN}(x_{after}(n))$) being generated for the first metal strip leaving the finishing line based on the second influencing parameters that are one of calculated and measured, and wherein the measured change in width $y_{actual}(n)$ is calculated according to the equation:

$$y_{pre}(n+1) = K_1 \cdot y_{actual}(n) + K_2 \cdot y_{NN}(n+1) + (1 - K_1 - K_2) \cdot y_{NN}(x_{after}(n)).$$

where $0 \leq k_1$ and $k_2$.

7. The method of claim 6, wherein $k_1$ is determined as a function of a first difference $y_{actual}(n) - y_{NN}(n)$, and wherein $k_2$ is determined as a function of a second difference $y_{actual}(n+i) - y_{NN}(n)$.

8. The method of claim 6, wherein, when processing successive metal strips of a same type, $k_1=1$ and $k_2=0$, and wherein, when a type of metal strip changes, $k_1=0$ and $k_2=1$.

9. An apparatus for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the apparatus comprising:

a control unit calculating first influencing parameters before a last edging pass in the roughing line to preset the finishing line, the change in width being dependent on the first influencing parameters;

a neural network having variable network parameters and receiving the first influencing parameters, the neural network generating a calculated value for the change in width as a function of the predicted value; and a measurement logger for measuring and calculating second influencing parameters after the metal strip passes through the finishing line as a function of other measured process parameters, wherein, after the strip metal passes through the finishing line, the second influencing parameters are provided to the neural network, and wherein the neural network reduces a deviation between a resulting network response and a measured change in width of the metal strip by adapting the variable network parameters of the neural network.

10. The apparatus of claim 9, wherein the first influencing parameters include at least one of a temperature and thickness of the metal strip before entering the finishing line, a temperature, thickness, specified width and exit velocity of the metal strip after leaving the finishing line, a strength of a material of the metal strip, a profile of the metal strip, a relative reduction in a thickness of the metal strip in individual roll stands of the finishing line, sliding positions of sliding rolls and tension in the metal strip between the individual roll stands of the finishing line.

11. The apparatus of claim 9, wherein the neural network includes an adaptive linear neuron.

12. The apparatus of claim 9, wherein the neural network includes a feed-forward network with a concealed layer including elements with a sigmoid response.

13. An apparatus for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the apparatus comprising:

a control unit calculating first influencing parameters before a last edging pass in the roughing line to preset the finishing line, the change in width being dependent on the first influencing parameters;

a neural network having variable network parameters and receiving the first influencing parameters, the neural network generating a calculated value for the change in width as a function of the predicted value; and a measurement logger for measuring and calculating second influencing parameters after the metal strip passes through the finishing line as a function of other measured process parameters, wherein, after the strip metal passes through the finishing line, the second influencing parameters are provided to the neural network, wherein the neural network reduces a deviation between a resulting network response and a measured change in width of the metal strip by adapting the variable network parameters of the neural network, and wherein, when a type of metal strip is changed, the resulting network response is used as the predicted value for the change in width and to adjust the roughing line, and wherein, when processing successive metal strips of a same type, the measured change in width of the preceding successive metal strips is used as the predicted value for the change in width and for adjusting the roughing line.

14. An apparatus for rolling a metal strip in a roughing line and a finishing line, wherein a rolling process in the roughing line is adjusted as a function of a predicted value for a change in width of the metal strip in the finishing line such that the metal strip has a predetermined finished strip width when leaving the finishing line, the apparatus comprising:

a control unit calculating first influencing parameters before a last edging pass in the roughing line to preset the finishing line, the change in width being dependent on the first influencing parameters;

a neural network having variable network parameters and receiving the influencing parameters, the neural network generating a calculated value for the change in width as a function of the predicted value; and a measurement logger for measuring and calculating second influencing parameters after the metal strip passes through the finishing line as a function of other measured process parameters, wherein, after the strip metal passes through the finishing line, the second influencing parameters are provided to the neural network, wherein the neural network reduces a deviation between a resulting network response and a measured change in width of the metal strip by adapting the variable network parameters of the neural network, and wherein, when at least one strip is positioned between a first metal strip (n+i, where i≧1) upstream from at least the last edging pass in the roughing line and a second metal strip (n) leaving the finishing line, the predicted value for the change in width of the first metal strip in the finishing line is calculated from a calculated value ($y_{NN}(x_{prev}(n+i))$) generated by the neural network, the resulting network response ($y_{NN}(x_{after}(n))$) being generated for the first metal strip leaving the finishing line based on the second influencing parameters that are one of calculated and measured, and wherein the measured change in width $y_{actual}(n)$ is calculated according to the equation:

$$y_{pre}(n+1)=k_1 \cdot y_{actual}(n)+k_2 \cdot y_{NN}(x_{prev}(n+1))+(1-k_1-k_2) \cdot y_{NN}(x_{after}(n)),$$

where $0 \leq k_1$ and $k_2 \leq$.

15. The apparatus of claim 14, wherein $k_1$ is determined as a function of a first difference $y_{actual}(n) - y_{NN}(n)$, and wherein $k_2$ is determined as a function of a second difference $y_{actual}(n+i) - y_{NN}(n)$.

16. The apparatus of claim 15, wherein, when processing successive metal strips of a same type, $k_1=1$ and $k_2=0$, and wherein, when a type of metal strip changes, $k_1=0$ and $k_2=1$.

17. The method of claim 1, further comprising the step of:

controlling the rolling process in the roughing line as a function of at least one of the first influencing parameters and the second influencing parameters.

18. The apparatus of claim 1, wherein the control unit controls the rolling process in the roughing line as a function of at least one of the first influencing parameters and the second influencing parameters.

* * * * *